(12) United States Patent
Gotthold et al.

(10) Patent No.: US 7,080,940 B2
(45) Date of Patent: Jul. 25, 2006

(54) IN SITU OPTICAL SURFACE TEMPERATURE MEASURING TECHNIQUES AND DEVICES

(75) Inventors: John P. Gotthold, Sunnyvale, CA (US); Terry M. Stapleton, San Jose, CA (US); Robert Champetier, Depoe Bay, OR (US); Hung Dang, San Jose, CA (US)

(73) Assignee: Luxtron Corporation, Santa Clara, CA (US)

( * ) Notice: Subject to any disclaimer, the term of this patent is extended or adjusted under 35 U.S.C. 154(b) by 0 days.

(21) Appl. No.: 10/839,876

(22) Filed: May 5, 2004

(65) Prior Publication Data

US 2004/0258130 A1 Dec. 23, 2004

Related U.S. Application Data

(63) Continuation-in-part of application No. 10/452,551, filed on May 30, 2003, now abandoned, which is a continuation of application No. 09/839,857, filed on Apr. 20, 2001, now Pat. No. 6,572,265.

(51) Int. Cl.
*G01J 5/08* (2006.01)
*G01J 5/28* (2006.01)
*G01K 1/14* (2006.01)
*G01K 11/20* (2006.01)
*F21V 8/00* (2006.01)
*G02B 6/00* (2006.01)

(52) U.S. Cl. .................. 374/161; 374/1.31; 374/208; 374/121; 385/12; 385/147; 250/458.1; 250/459.1; 250/2.34; 250/578.1

(58) Field of Classification Search ............... 374/161, 374/131, 208, 121, 126, 133, 128; 385/12, 385/88, 31, 33, 35, 147; 250/458.1, 459.1, 250/234, 578.1
See application file for complete search history.

(56) References Cited

U.S. PATENT DOCUMENTS 3,877,411 A 4/1975 MacDonald (Continued)

FOREIGN PATENT DOCUMENTS

JP 6-112303 4/1994

(Continued)

OTHER PUBLICATIONS

PCT Int'l Search Report, filed Dec. 28, 2005, PCT.

*Primary Examiner*—Gail Verbitsky
(74) *Attorney, Agent, or Firm*—Jones Day

(57) ABSTRACT

A temperature sensor that has a thermally conducting contact with a surface that emits electromagnetic radiation in proportion to the temperature of the contact is disclosed. The sensor has a resilient member attached to the contact and configured to extend the contact toward the object to be measured. A first light waveguide is attached to the contact and is configured to transmit the electromagnetic radiation from the contact. The sensor has a guide with a bore formed therein that the first waveguide is insertable into. When the contact is moved, the first waveguide moves within the bore. A second waveguide is attached to the guide such that a variable gap is formed between the ends of the first waveguide and the second waveguide. Electromagnetic energy from the first waveguide traverses the gap and can be transmitted by the second waveguide. The guide allows the first waveguide to move with the contact in order to ensure that the contact is fully engaged with the surface of the object.

16 Claims, 8 Drawing Sheets

U.S. PATENT DOCUMENTS

| | | | |
|---|---|---|---|
| 4,444,990 A * | 4/1984 | Villar ..................... 136/221 |
| 4,448,547 A | 5/1984 | Wickersheim |
| 4,459,046 A | 7/1984 | Spirg |
| 4,569,570 A | 2/1986 | Brogårdh et al. |
| 4,626,110 A | 12/1986 | Wickersheim et al. |
| 4,652,143 A | 3/1987 | Wickersheim et al. |
| 4,750,139 A | 6/1988 | Dils |
| 4,752,141 A | 6/1988 | Sun et al. |
| 4,986,671 A | 1/1991 | Sun et al. |
| 5,000,901 A * | 3/1991 | Iyer et al. ................. 264/299 |
| 5,173,432 A * | 12/1992 | Lefkowitz et al. .......... 293/102 |
| 5,183,338 A | 2/1993 | Wickersheim et al. |
| 5,294,200 A | 3/1994 | Rall |
| 5,315,092 A | 5/1994 | Takahashi et al. |
| 5,433,525 A | 7/1995 | El-Ibiary |
| 5,556,204 A | 9/1996 | Tamura et al. |
| 5,673,750 A * | 10/1997 | Tsubone et al. ............ 165/275 |
| 5,775,808 A | 7/1998 | Pan |
| 5,791,782 A | 8/1998 | Wooten et al. |
| 5,893,643 A | 4/1999 | Kumar et al. |
| 6,056,433 A | 5/2000 | Yam |
| 6,079,874 A | 6/2000 | Hegedus |
| 6,084,215 A | 7/2000 | Furuya et al. |
| 6,086,246 A | 7/2000 | Shufflebotham et al. |
| 6,110,288 A | 8/2000 | Penelon et al. |
| 6,140,612 A | 10/2000 | Husain et al. |
| 6,179,466 B1 | 1/2001 | Peuse et al. |
| 6,183,130 B1 | 2/2001 | Adams et al. |
| 6,231,230 B1 | 5/2001 | Baldock et al. |
| 6,353,210 B1 | 3/2002 | Norrbakhsh et al. |
| 6,481,886 B1 * | 11/2002 | Narendrnath et al. ....... 374/141 |
| 2003/0112848 A1 * | 6/2003 | Khan ..................... 374/161 |
| 2004/0004990 A1 | 1/2004 | Khan |

FOREIGN PATENT DOCUMENTS

| | | |
|---|---|---|
| JP | 7-151606 | 6/1995 |
| JP | 9-297072 | 11/1997 |
| JP | 2000-81355 | 3/2000 |
| WO | WO 00/03216 | 1/2000 |
| WO | WO 01/36916 | 5/2001 |

* cited by examiner

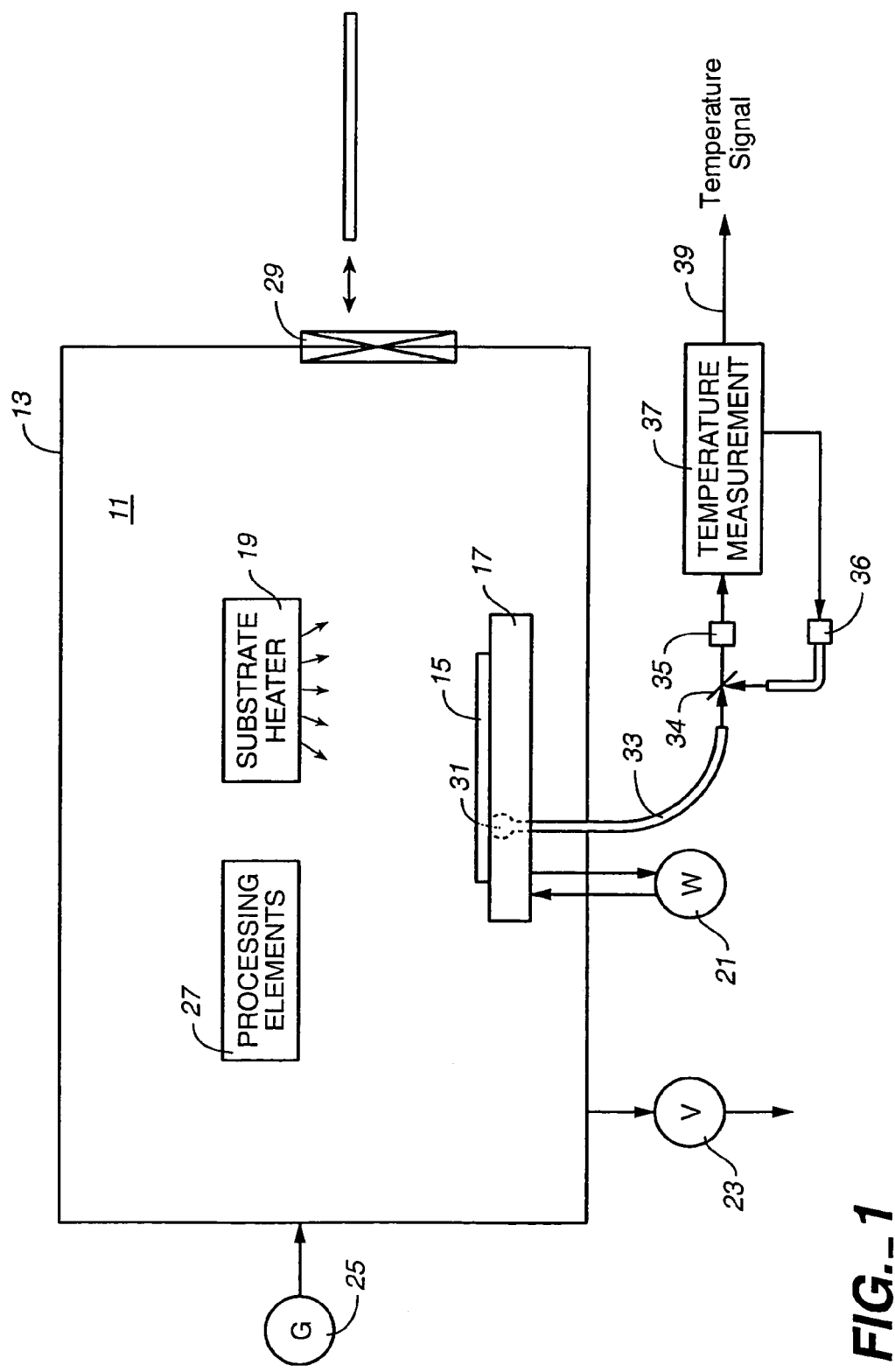
FIG._1

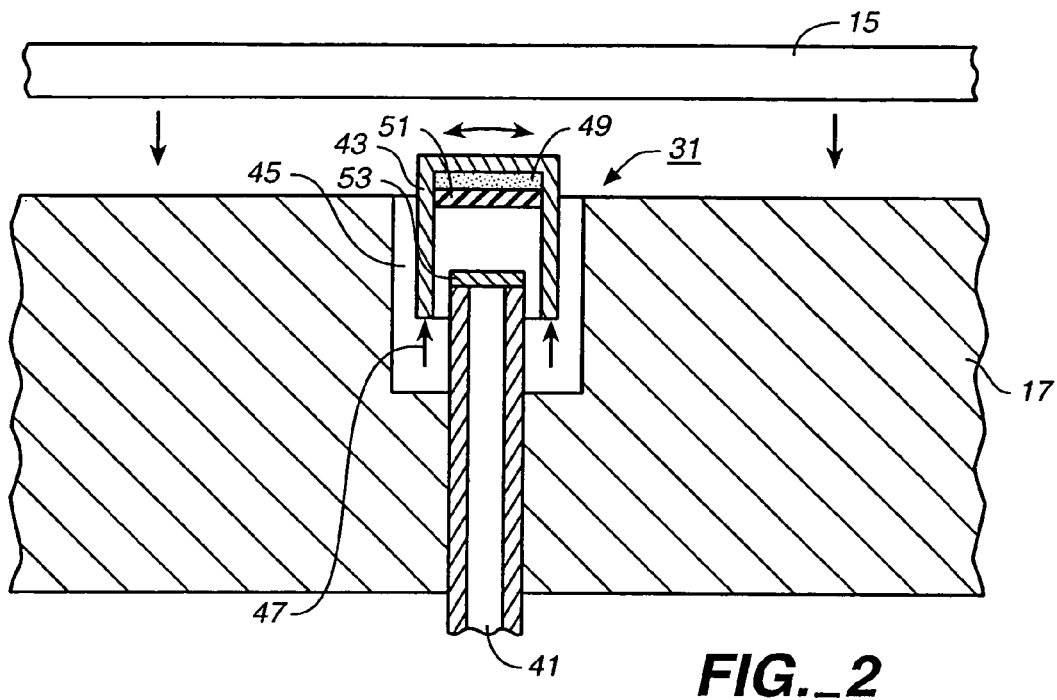
FIG._2
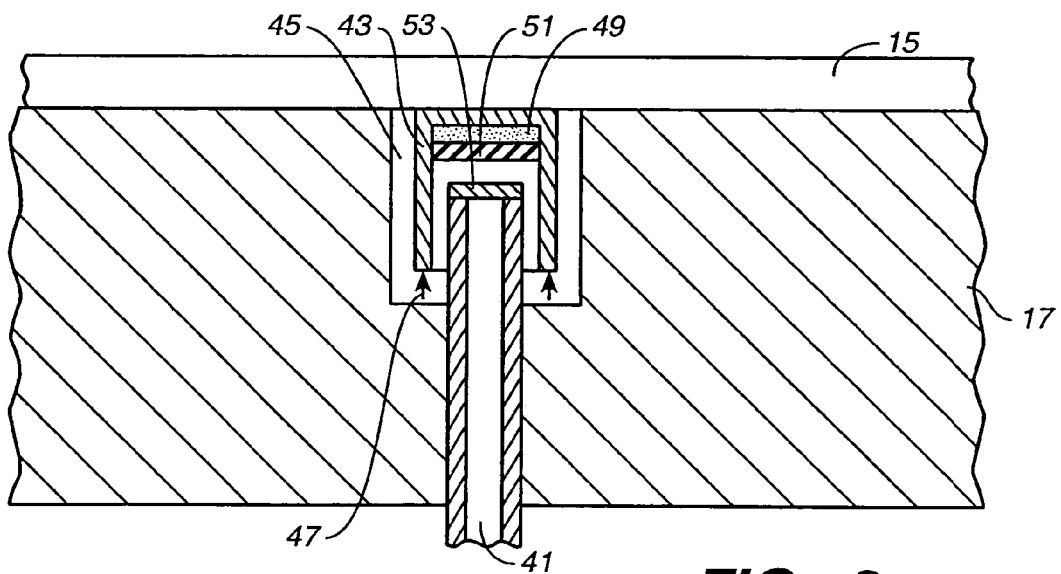
FIG._3

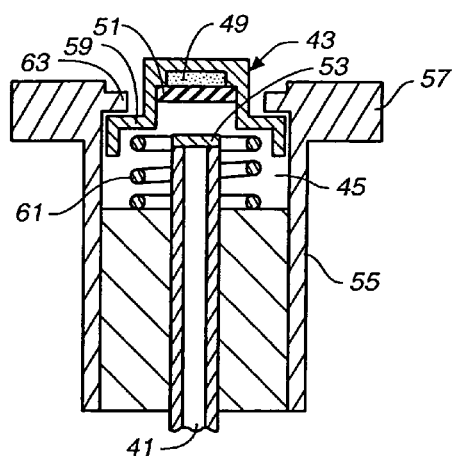
FIG._4
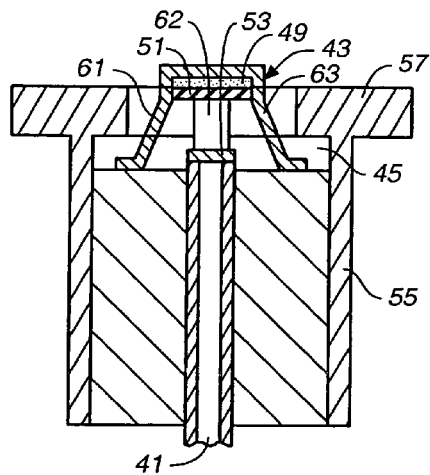
FIG._5
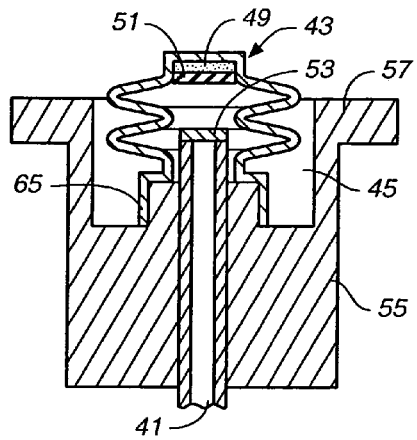
FIG._6
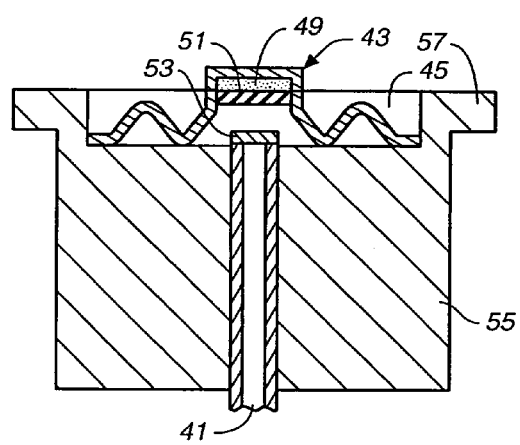
FIG._7
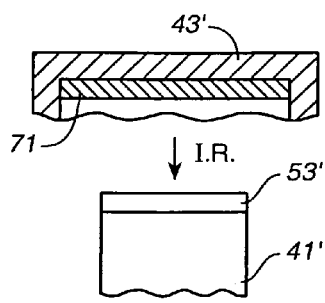
FIG._8
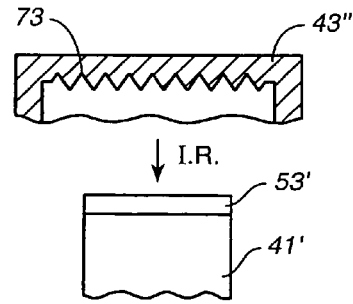
FIG._9

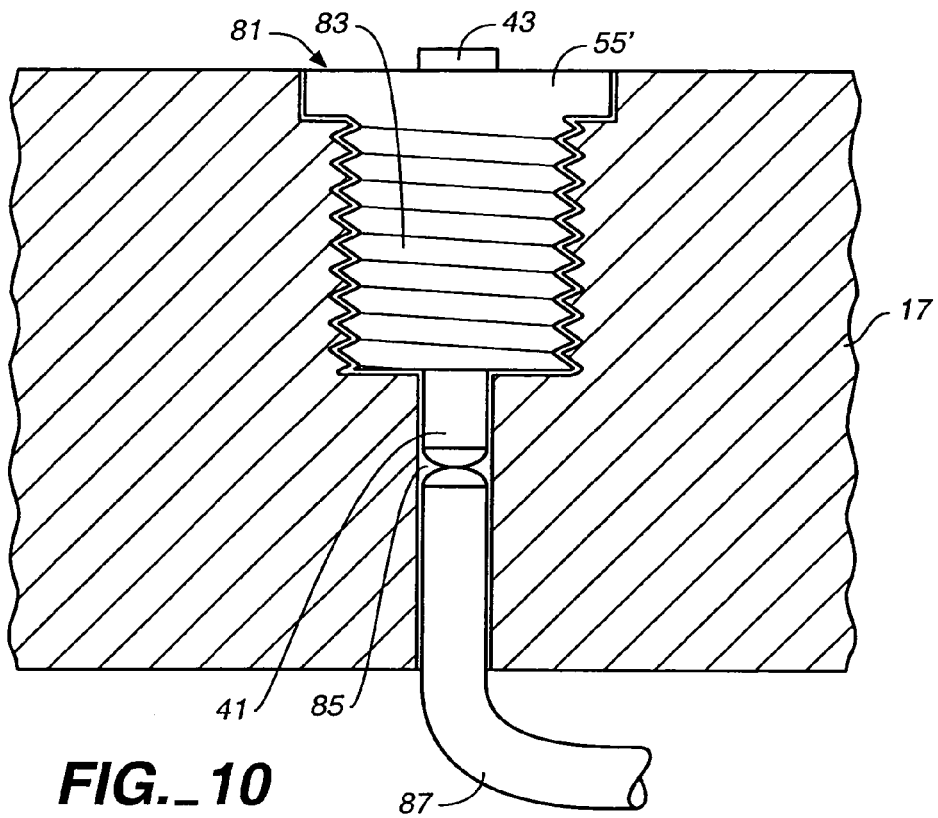
FIG._10
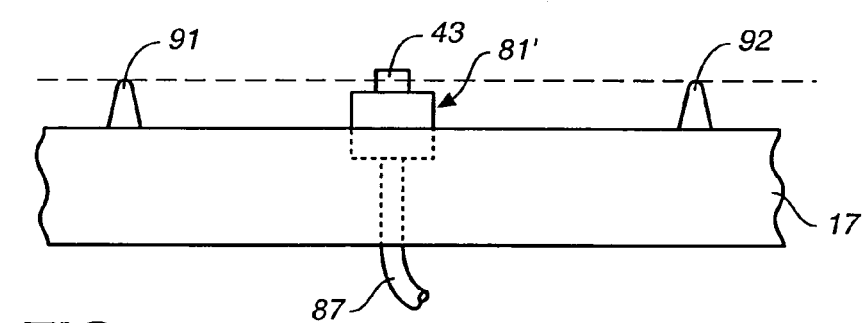
FIG._11
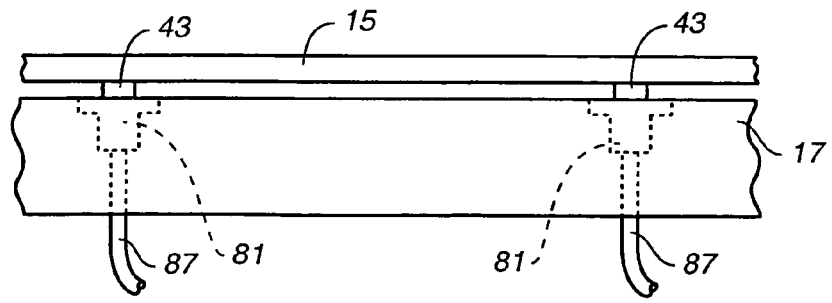
FIG._12

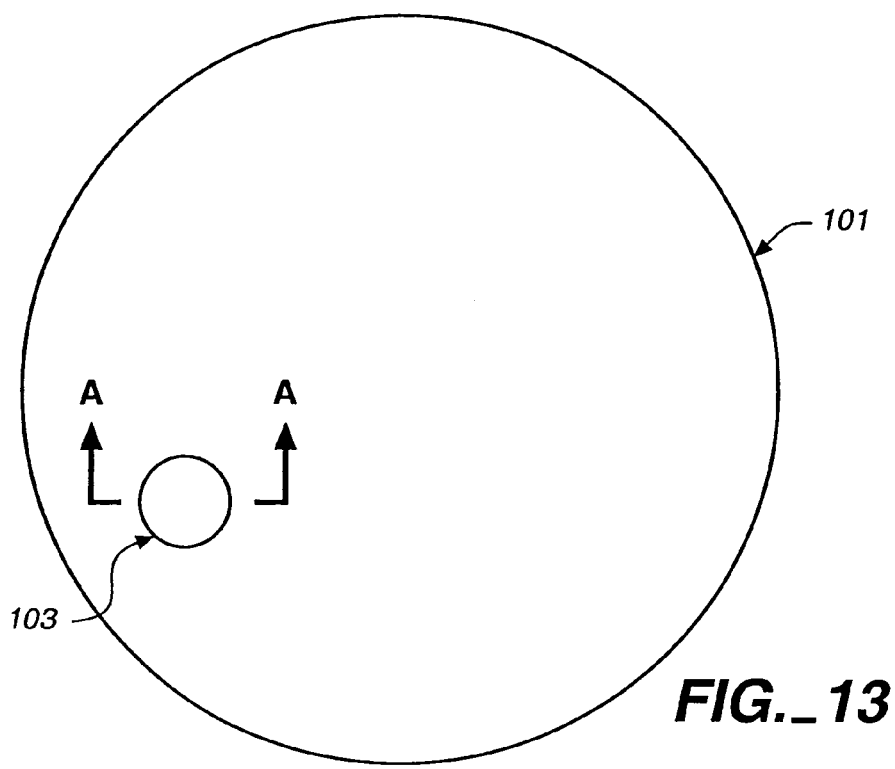
FIG._13
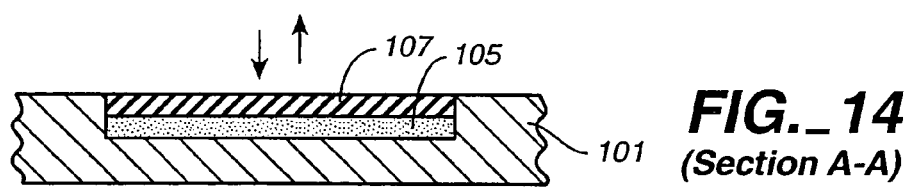
FIG._14
(Section A-A)
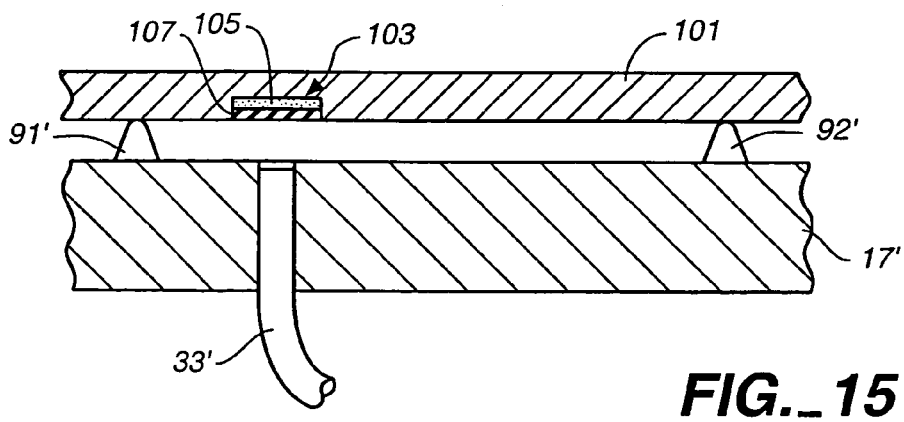
FIG._15

IN SITU OPTICAL SURFACE TEMPERATURE MEASURING TECHNIQUES AND DEVICES

RELATED APPLICATIONS

This application is a continuation-in-part of application Ser. No. 10/452,551, filed May 30, 2003 now abandoned, which is a continuation of application Ser. No. 09/839,857 filed Apr. 20, 2001, now U.S. Pat. No. 6,572,265 issued Jun. 3, 2003, the contents of each are incorporated by reference herein.

FIELD OF THE INVENTION

This invention relates generally to optical temperature measuring techniques, and, more specifically, to devices and techniques for contact and non-contact methods of measurement of the surface temperature of an article during processing.

BACKGROUND OF THE INVENTION

There has been a great deal written about various optical temperature measuring techniques, both in patents and the technical literature, as well as many commercial products utilizing this technology. In one aspect of this technology, a luminescent material is used as a temperature sensor because certain aspects of its luminescence are temperature dependent. Typically in the form of a sensor at the end of a fiber optic cable, the luminescent material is excited to luminescence by sending excitation radiation of one wavelength to the sensor through the optical fiber, and the resulting luminescence at a different wavelength is photo-detected after passing back along the optical fiber. The detected signal is then processed to determine the temperature of the luminescent material in the sensor. Basic concepts of luminescent temperature sensing, as well as many different forms of sensors, are described in U.S. Pat. No. 4,448,547. The measurement of the decay time of the luminescence after termination of an excitation pulse, as a measurement of temperature, is described in U.S. Pat. No. 4,652,143. Commercial products adopted the decay time measurement technique as a good measurement of temperature. One advantage and focus of luminescent temperature measurement techniques has been for applications in environments having strong electric and/or magnetic fields and the like, where metal sensors cannot be relied upon to provide accurate results because the metal is heated when immersed in the electromagnetic field, causing a bias in the readings.

Applications of these luminescent sensor measurement techniques are numerous, including the measurement of surface temperature. U.S. Pat. No. 4,752,141 describes an elastomeric luminescent sensor at the end of an optical fiber that deforms as it is pushed against a surface being measured in order to establish good thermal contact. Another embodiment employing a thin non-metallic disc with a layer of luminescent material between it and the end of an optical fiber is also described.

Another optical temperature measuring technique relies upon the infrared emissions of a black-body sensor, or one having the characteristics of a black-body. An example of such a system, generally used to measure higher temperatures than measured with luminescent sensors, is described in U.S. Pat. No. 4,750,139. The sensor is a black-body emitter formed at the end of an optical fiber. U.S. Pat. No. 5,183,338 describes several forms of a fiber optic sensor that includes both luminescent and blackbody temperature measuring elements. Each of the foregoing identified patents is expressly incorporated herein in its entirety by this reference.

There are also many other optical temperature sensing techniques that have been described in patents and the literature, as well as being used commercially. But the luminescent and black-body techniques have generally been preferred over those others.

SUMMARY OF THE INVENTION

Additional aspects, features and advantages of the present invention are included in the following description of exemplary embodiments thereof, which description should be taken in conjunction with the accompanying drawings.

A sensor for measuring the temperature of the surface of an object is disclosed. The sensor has a cap having an end wall of thermally conducting material that is shaped to conform to a shape of the object. The inside surface of the end wall of the cap emits electromagnetic radiation having a detectable optical characteristic that is proportional to the temperature of the end wall. The sensor further comprises a waveguide disposed generally orthogonal to the cap. The inside surface of the cap is in optical communication with the waveguide in order to transmit the electromagnetic radiation therefrom. The sensor also has a resilient member connected to the cap in a manner to urge the cap away from the waveguide a limited distance in a manner that allows a limited degree of axial and directional freedom with respect to the waveguide. In this respect, the cap can firmly engage the object surface when positioned in contact therewith.

In accordance with another embodiment of a temperature sensor, there is provided a sensor with a thermally conducting contact having a surface that emits electromagnetic radiation with a detectable optical characteristic that is proportional to the temperature of the contact. A resilient member is attached to the contact and configured to extend the contact toward the object to be measured. A first waveguide is attached to the contact and is configured to transmit the electromagnetic radiation from the contact. The sensor further has a guide with a bore formed therein. The first waveguide is insertable into the bore such that when the contact is moved, the first waveguide moves within the bore. A second waveguide is attached to the guide such that a variable gap is formed between the ends of the first waveguide and the second waveguide. Electromagnetic energy from the first waveguide traverses the gap such that it can be transmitted by the second waveguide. In this regard, the guide allows first waveguide to be able to move with the contact in order to ensure that the contact is fully engaged with the surface of the object.

In accordance with yet another embodiment, a temperature sensor having a tip and a contact is disclosed. The temperature sensor has a thermally conducting contact with a surface that emits electromagnetic radiation with a detectable optical characteristic that is proportional to the temperature of the contact. The tip has a barrel section and a mating section and is attached to the contact. The sensor further includes a shield with an opening formed in an end thereof and an annular ledge formed around the opening. The opening is configured such that the barrel portion of the tip passes through the opening and the annular ledge is shaped to be complementary to the mating section of the tip. The sensor has a resilient member attached to the contact and is configured to extend the barrel portion through the opening such that the contact is extended toward the object.

A waveguide is disposed within the tip and is configured to transmit the electromagnetic radiation emitted from the surface of the contact. The opening and the ledge allow a limited degree of rotational freedom of the tip to thereby provide engagement between the contact and the object.

BRIEF DESCRIPTION OF THE DRAWINGS

FIG. 1 is a general schematic diagram that shows a processing chamber in which a temperature sensor of the present invention may be used;

FIG. 2 is a cross-sectional view of a general form of a surface temperature sensor;

FIG. 3 shows the temperature sensor of FIG. 2 in contact with a surface being measured;

FIG. 4 is a cross-sectional view of a first specific example surface temperature sensor;

FIG. 5 is a cross-sectional view of a second specific example surface temperature sensor;

FIG. 6 is a cross-sectional view of a third specific example surface temperature sensor;

FIG. 7 is a cross-sectional view of a fourth specific example surface temperature sensor;

FIG. 8 illustrates a modification of any of the temperature sensors of FIGS. 2–7 to include a first form of an infrared emitter as the temperature sensor;

FIG. 9 illustrates a modification of any of the temperature sensors of FIGS. 2–7 to include a second form of an infrared emitter as the temperature sensor;

FIG. 10 shows a form of package for any of the temperature sensors of FIGS. 4–9;

FIG. 11 shows one example use of a temperature sensor, according to any of FIGS. 2–10;

FIG. 12 shows another example use of a temperature sensor according to any of FIGS. 2–10;

FIG. 13 illustrates a test substrate with a luminescent temperature sensor built into a surface;

FIG. 14 is a sectional view of FIG. 13, taken at section A—A thereof;

FIG. 15 shows one way of optically coupling with the substrate sensor of FIGS. 13 and 14;

DESCRIPTION OF EXEMPLARY EMBODIMENTS

Figure 16:
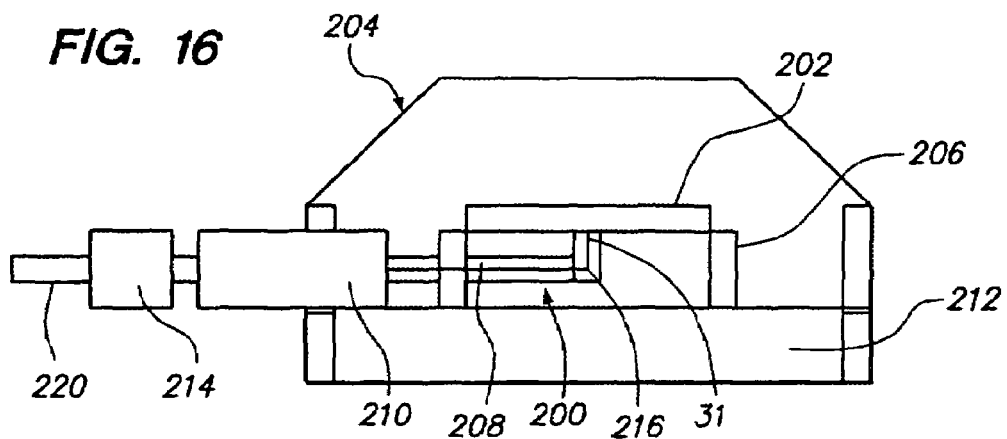
FIG. 16 is a block diagram of another embodiment of a temperature sensor for measuring the temperature of a substrate.

The surface temperature techniques and sensors of the present invention may be used in a wide variety of environments and applications. The temperature of surfaces on any of a large number of types of objects may be measured. These measurements can be made while the object is being subjected to some processing where knowledge of the temperature of its surface is desired, or, otherwise. The example application described herein is the measurement of the temperature of the surface of substrates during one or more steps of processing to form integrated circuits and/or visual display elements such as liquid crystal display devices (LCDs) thereon. The substrate is either a semiconductor wafer or that of a flat panel display, in the examples described.

Referring to FIG. 1, a general evacuated processing chamber 11 formed by an enclosure 13 is schematically illustrated. A substrate 15 being processed within the chamber is supported horizontally or vertically by a structure appropriate for the substrate and type of processing, the support in this case being a chuck 17 upon which the substrate rests in a horizontal position. The substrate 15 is typically heated in some fashion, a radiant heater 19 being shown. In some processes, the chuck 17 is cooled by circulation of water or some other coolant through it from an outside water supply 21 that includes refrigeration to cool the water. A vacuum pump 23 lowers the pressure within the chamber 11. Many processes involve the introduction of one or more gases into the chamber 11, an external supply 25 of such gas(es) being shown. Specific processing elements 27 within the chamber 11 vary depending upon the process being performed. Chemical vapor deposition (CVD) and physical vapor deposition (PVD), such as sputtering and vaporization, are among the processes wherein the temperature measurement techniques of the present invention have application. Substrates are loaded into and unloaded from the chamber 11 through a load lock 29.

In the example of FIG. 1, the chuck 17 is provided with a temperature sensor 31 that contacts an underside of the substrate 15, when lying on the chuck, to measure the temperature of the contacted surface. An optical signal of the sensor 31 is coupled to a photodetector 35 by an optical communication medium 33 which can be a waveguide in the form of an optical fiber, other form of light pipe or a hollow waveguide. An electrical signal output of the photodetector 35 is received by a measuring circuit card or instrument 37 to provide an output signal 39 of the measured temperature. This signal can be used for a number of purposes, such as to drive an indicator (not shown) that provides a human operator with the temperature information that enables he or she to make adjustments to the heater 19 or other aspects of the processing. Alternatively, the signal 39 can be used by a control system (not shown) of the processing chamber in a feedback loop to control the heater 19 or other processing element.

The optical temperature measuring element of the sensor 31 may be a luminescent material that has some aspect of its luminescence highly temperature-dependent. Measurement of the decaying characteristics of the luminescent radiation output signal is usually preferred, as described in the patents discussed in the Background section above. When a luminescent sensor is employed, an excitation source 36 and beam splitter 34 are added to the configuration of FIG. 1. An alternative sensor element is a non-luminescent surface of known emissivity that emits electromagnetic radiation with a magnitude proportional to its temperature, as previously described. Other potential optical temperature measuring techniques include monitoring the frequency of the band edge of a semiconductor element, the absorption of incident radiation by an element of temperature dependent transmission and the color of a material that changes with temperature.

A general form of sensor 31 is illustrated in FIGS. 2 and 3. A light waveguide 41, such as an optical fiber, or other form of light pipe or hollow waveguide, is held fixed within the chuck 17. A cap 43 of material having a high degree of thermal conductivity is positioned within an aperture 45 and held by a resilient element 47 a distance away from an end of the waveguide 41. The cap 43 normally extends a short distance above the upper surface of the chuck 17, as shown in FIG. 2, but the resilient element 47 that holds the cap in that position has a strength that is designed to allow the weight of the substrate 15 to urge the cap downward into the opening 45 when the substrate 15 is laid on the chuck 17. A substrate contacting end of the cap 43 has at least a significant portion of its surface formed in a mating shape to that of the surface being measured in order to form an intimate contact with that surface. That shape in this case is planar. The cap 43 is also allowed to rotate within some limit with respect to the fixed waveguide in order to facilitate its mating surface being orientated in close contact with the substrate surface as the substrate is lowered onto the chuck 17.

The cap 43 may be made of a very thin heat conducting metal, such as nickel, whose substrate-contacting end does not deform in shape during normal use. In this general example, the cap 43 has a cylindrical shape in side-view, a cross-sectional side view being shown in FIGS. 2 and 3. In addition to serving to contact the substrate, the cap 43 is a carrier of the optical temperature sensing element. In FIGS. 2 and 3, this element is a layer 49 of luminescent material that is attached to an inside surface of the cap 43. An optically transparent cover 51 is usually used to seal the luminescent material layer 49 from out-gassing that can result from use in a very low-pressure chamber. Gasses escaping from the luminescent material can interfere with the processing. The cover 51 may be made from sapphire, for example, since it is a very stable and inert material. Similarly, a sapphire cover 53 may be attached to the end of the waveguide 41 to prevent out-gassing of the waveguide materials. However, if the waveguide is itself made of sapphire, this is not necessary. Although the cap form of the carrier for the luminescent material is preferred, alternate carrier shapes are also possible.

Four different specific embodiments of the sensor generally shown and described with respect to FIGS. 2 and 3 are shown in FIGS. 4–7 wherein the same reference numbers are used for corresponding elements. Each sensor is shown in the form of a cartridge having an outer housing 55 with an outside shape that is suitable for its intended application. The entire unit is then inserted into a mating aperture of the chuck 17 or other element in which it is installed. The outside shape of the housing 55, and thus the mating aperture of the chuck 17, can be cylindrical (as shown), square or any other suitable shape. The housing preferably has an outwardly extending flange 57 that positions the sensor within the chuck in an axial direction.

In the embodiment of FIG. 4, the cap 43 is shaped to provide a ledge 59 against which a spring 61 (the resilient element 47) urges the cap upward. That same ledge also abuts a ledge 63 around the opening in the housing 57 through which the cap 43 extends, thereby constraining maximum movement of the cap 43 out of the housing, When the substrate 15 pushes against the end surface of the cap 43, the cap is pushed downward into the opening 45 against the force of the spring 61. In order to make sure that the cover 51 does not touch the end cover 53 of the optical fiber when the cover is pushed into the opening by the weight of a substrate, and thus limit its travel, the distances are made sufficient so that this does not occur. A void exists between the covers 51 and 53 at all times.

A difference with the embodiment of FIG. 5 is that the resilient element is formed as part of the cap. The cap 43, instead of cylindrically shaped side walls, includes integral fingers 61, 62 and 63 that bend to cause their lower terminations to spread horizontally as the cap is pushed downward into the opening 45 when urged against a substrate surface. When not pushed downward, these fingers 61, 62 and 63 hold the surface contacting end of the cap 43 above the upper surface of the housing flange 57.

The embodiment of FIG. 6 also uses a cap that has the resilient element formed in its side walls. In this case, the side walls are a bellows that allows the exposed end of the cap 43 to be pushed into the opening 45. An end 65 of the integral cap structure is conveniently made to fit onto a mating boss formed as part of the housing 55. The two mating surfaces may be held together by a layer of glue between them. The shape of the mating surfaces may be cylindrical (as shown), square or any other shape that is suitable for a particular application. The end of the waveguide thus extends into the interior of the bellows, again with space between the waveguide and the inside of the cap being maintained even when the cap is pushed downward by contact with the surface being measured. Such an open end bellows cap element, suitable for this application is available from Servometer Company. The housing 55 is preferably machined or molded as a single piece from polyamide-imide, this material being available from the General Electric Company. When the cap 43 is of a unitary, gas impermeable structure, and its open end is sealed to the housing 55, the covers 51 and 53 may be omitted.

In the embodiment of FIG. 7, the fingers of the embodiment of FIG. 5 are extended substantially horizontally and provided with folds similar to those of the bellows in the embodiment of FIG. 6. The ends of these fingers are attached by glue to the housing 55. As the top surface of the cap is pushed downward, as with the bellows of the FIG. 6 embodiment, the folds of the fingers move closer together but return to their uncompressed state shown in the drawings when that force is removed from the cap.

FIGS. 8 and 9 show a modification of the sensors of FIGS. 2–7 where a blackbody surface is substituted for the luminescent material layer 49 as the temperature sensor. This is desirable when the range of temperatures being measured is higher than that which can be measured by luminescent materials. In FIG. 8, a layer 71 of material of a known, controlled surface emissivity is applied to an inside surface of an end of the cap 43'. This emissivity is preferably made to be high, in a range of 0.8 to 1.0, where 1.0 is the emissivity of a black body. The layer 71 can most simply be a paint that is applied to the inside of the cap. Alternatively, the layer 71 is omitted if the material of the cap 43' is selected to have a known emissivity of its surfaces that is high enough for practical use.

In the sensor of FIG. 9, the inside surface of the cap 43" is altered to include a number of cavities 73, preferably conical in shape, that simulate the emissivity of a black body. With either of the sensors of FIG. 8 or 9, it is the intensity of emissions of the surface in the infrared range that are detected by the photo-detector 35 of FIG. 1 and measured by the system 37. The excitation source 36 and beam splitter 34 of FIG. 1 are not used. The intensity is proportional to the temperature of the surface that is emitting the infrared radiation.

A preferred form of a cartridge sensor according to any one of FIGS. 4–9 is shown in FIG. 10. A sensor 81 includes an outer housing 55' like the housing 55 of FIGS. 4–7 but with threads 83 added to a portion of an outside surface. An opening in the chuck 17 is preferably configured to be completely filled by the sensor 81 and includes threads on an inside surface that mate with the threads 83 to firmly hold the sensor 81 in place within the chuck 17. The threads are replaced with smooth mating surfaces, which are then glued together, when used within vacuum chambers in order to avoid pockets between the threads which can hold gases. Or, if threads are used in a vacuum application, the housing 55' is sealed to the chuck 17 at its top surface to prevent the escape of such trapped gases into the processing chamber. An opening 85 extends through the chuck 17 from the opening receiving the sensor 81 as a conduit for the waveguide 41. Rather than extending that waveguide continuously through the chuck 17, however, it is terminated to form a short stub extending from the bottom of the sensor 83. Another waveguide 87, preferably in the form of an optical fiber, is inserted into the opening 85 to optically communicate with the waveguide 41 and extend to the detection and measurement equipment. A lens, as shown, is attached to the mating ends of each of the waveguide 41 and optical fiber 87 in order to more efficiently couple radiation between the two. An advantage of the configuration of the sensor 81 is that it can easily be installed and replaced in the chuck 17.

The general form of the sensors described is shown in FIGS. 2 and 3 to operate with the substrate being carried directly by an upper surface of the chuck 17. The temperature sensors described above also have other applications. In FIG. 11, for example, the substrate is held above the surface of the chuck 17 by posts 91 and 92. A sensor 81', like the sensor 81 but without the upper flange, extends above the chuck surface to position the sensor cap 43 above the dashed line that represents the lower surface of the substrate 15 when carried by the posts. The cap 43 is then pushed downward by the weight of the substrate when carried by the posts 91 and 92, to make firm contact with the underside of the substrate.

FIG. 12 illustrates use of two or more sensors 81 to additionally provide support for the weight of the substrate 15. In this case, the resilient element within the sensor is made stronger than before so that the cap 43 is not pushed within the housing of the sensor. Some small degree of compression of the resilient element and rotation of the cap are desired in order to make firm thermal contact with an underside of the substrate.

A different form of luminescent temperature sensor is shown in FIGS. 13 and 14. A test substrate 101, preferably in the shape of a semiconductor wafer, flat panel display, or other substrate being processed, includes a temperature sensor 103 built into a substrate surface. A layer 105 of luminescent material is sealed within a recess of the substrate by an optically transparent window 107 made of an appropriate material such as sapphire. Excitation radiation is passed through the window to the luminescent material, and resulting temperature dependent luminescent radiation passes back through the window.

Interrogation of the sensor 103 occurs by positioning appropriate optics to communicate with it while the substrate 101 is positioned within the processing chamber 11 (FIG. 1) in the same manner as substrates that are being processed. An example is shown in FIG. 15, where the test wafer 101 is held by posts 91' and 92' above a chuck 17'. An optical fiber 33', or other appropriate waveguide, terminates in an upper surface of the chuck 17'. The sensor 103 is within the field of view of the optical fiber 33' when the test wafer 101 is properly positioned on the chuck 17'. Although use of posts 91' and 92' is shown, the wafer can be supported by the upper surface of the chuck 17' with the sensor 103 being very close to, or in contact with, the end of the optical fiber 33'. In the course of processing a large number of substrates, such a test substrate is occasionally substituted for a substrate being processed in order to occasionally calibrate the substrate heating system within the chamber.

Figure 17:
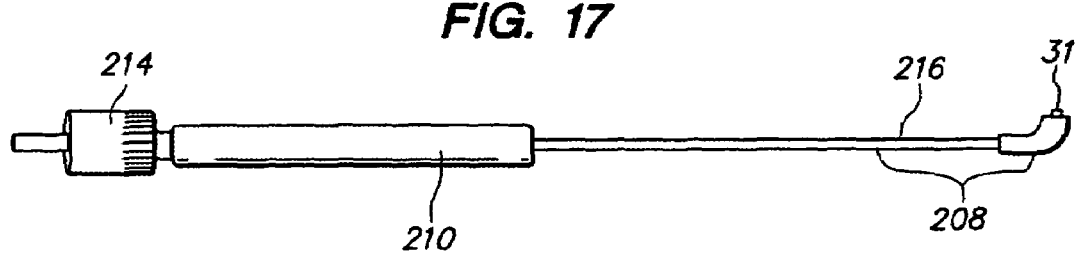
FIG. 17 is an elevation view of the sensor shown in FIG. 16.

In addition to the foregoing, FIGS. 16 and 17 illustrate a temperature sensor 200 in contact with a substrate 202 at varying angles of separation. Referring to FIG. 16, the temperature sensor 200 is mounted within a chamber 204 such as a reactive gas and/or vacuum containment chamber used for processing materials such as semiconductors. The substrate 202 is supported by posts 206 or any other type of fixture used to securely mount the substrate 202 within the chamber 204. The temperature sensor 200 is positioned under the substrate 202 in a manner whereby the temperature sensor 200 contacts the underside of the substrate 202. The temperatures sensor 200 physically contacts the material to be measured and is similar to the temperature sensor 31 and other embodiments previously described. In this respect, the temperature sensor 200 may include a cap 43 that contacts the underside of the substrate 202, a layer 49 of luminescent material, a resilient member 47 and an optical fiber 41 for the measurement of temperatures, as previously described. The temperature sensor 200 is attached to a shield 208 and a variable seal core 210 which is made from a material such as stainless steel that is resistant to the vacuum and reactive gases contained within the chamber 204. As seen in FIG. 16, the core 210 is attached to an equipment mounting plate 212 and enters the chamber 204 through a seal-able opening oriented at an axial direction different than the axial direction of temperature sensor 200. In this respect, the temperature sensor 200 is mounted at an angle generally orthogonal to the shield 208 and the core 210. It will be recognized by those of ordinary skill in the art that the temperature sensor 200 can be oriented at any angle that allows contact with the underside of the substrate 202.

In order to communicate the optical signal from the temperature sensor 200, an optical waveguide 216 is attached to the temperature sensor 200 and an optical connecter 214 outside of the chamber 204. The optical connector 214 is attached to an optical reading device 220 such as processing element 27 as previously described. The optical waveguide 216 can be a fiber composed of sapphire or other materials that can efficiently transmit and contain optical energy. The optical waveguide 216 is protected from the environment of the chamber 204 by the shield 208 that is constructed from a thermal and optical energy reflective material such as aluminum. Because the shield 208 and the optical waveguide 216 are bent to position the sensor 200 on the underside of the substrate 202, a thermally excited output signal from the sensor 200 proceeds down the waveguide 216 and changes axial direction while remaining within the waveguide 216. The thermally excited signal then proceeds through the optical connector 214 to the reading device 220.

Figure 18:
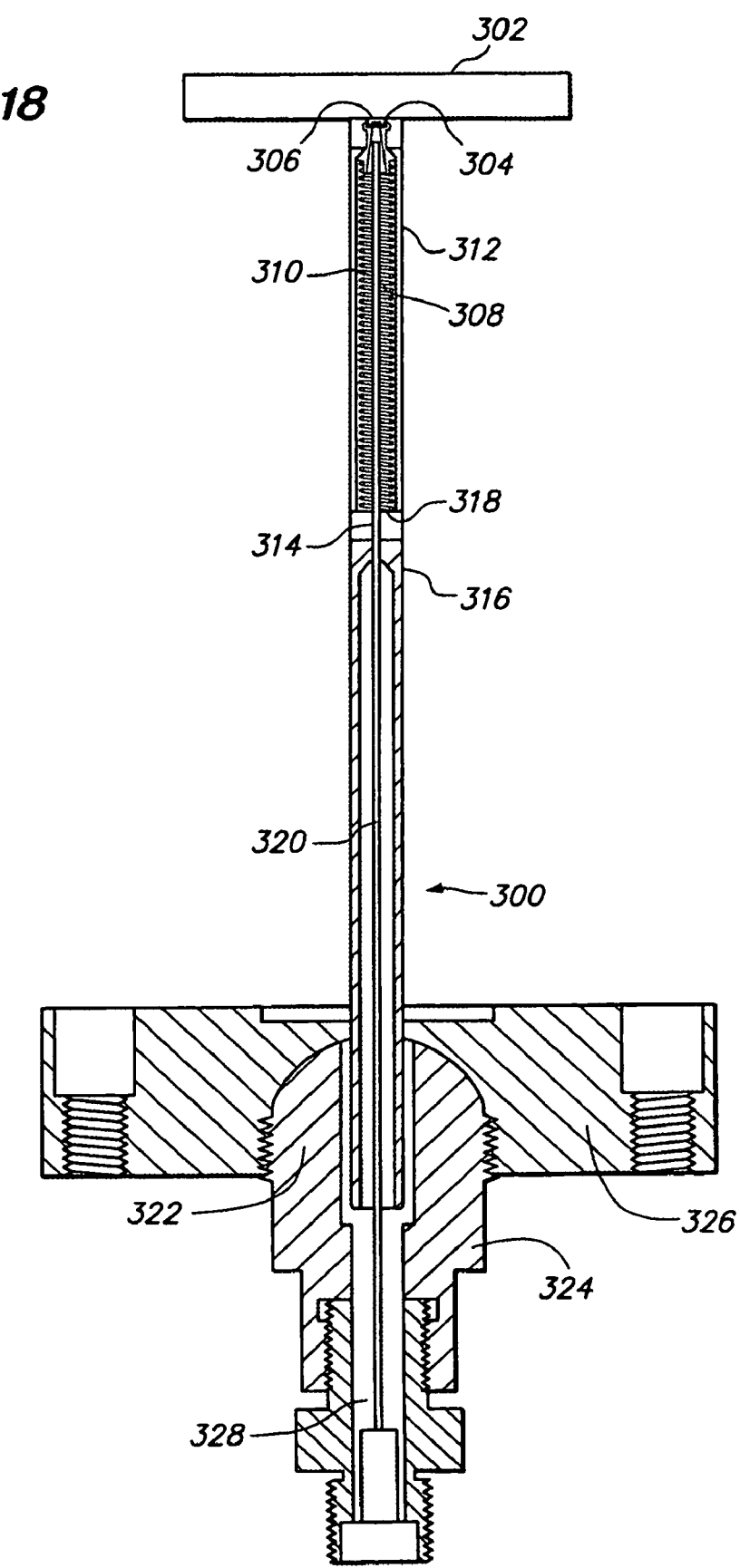
FIG. 18 is a cross-sectional view of another embodiment of the temperature sensor using two waveguides.

Referring to FIG. 18, a cross sectional view of a temperature sensor 300 is shown. The sensor 300 is used to measure the temperature of a substrate 302. The sensor 300 can be positioned under the substrate as shown in FIG. 18, or in any position relative to the substrate whereat the sensor 300 can contact the substrate. A contact 304 constructed from a high temperature and reactive gas resistive material such as aluminum nitride is used to physically engage the substrate 302. The contact 304 is formed and textured for thermal contact with the substrate 302. Bonded within a cavity of the contact 304 is a thermographic (temperature-dependent luminescence properties) phosphor layer 306. Alternatively, the cavity may also be coated with a black, high temperature tolerant material that radiates optically as a black body. The size and the shape of the contact 304 is determined such that thermal transmission away from the contact surface is minimized thereby allowing a sufficient percentage of the thermal power to be conductively transmitted to the phosphor layer 306.

As previously described for the temperature sensor of FIG. 2, the phosphor layer 306 emits optical radiation corresponding to the temperature of the substrate 302. The optical radiation is coupled into a moveable fiber 308 that is fixedly adhered to the contact 304. Specifically, the fiber 308 is adhered within the cavity of the contact 304 such that optical radiation from the phosphor layer 306 can be transmitted through the fiber 308. In this regard, the fiber 308 can be adhered directly to the phosphor layer 306 or if a black body material is deposited within the cavity, the fiber 308 may be positioned an optimum distance from the black body material. The fiber 308 is adhered to the contact with a high temperature adhesive such as Cotronics Resbond 940 LE or any other low expansion, low out gassing adhesive.

The contact 304 is fixedly attached to a resilient member 310 which is enclosed by a shield 312. The resilient member 310 may be a spring manufactured from a high thermal and reactive gas resistant material. The resilient member 310 provides a biasing force against the contact 304 such that the contact 304 is urged toward the substrate 302. Furthermore, the resilient member 310 allows the contact 304 rotational freedom to fully engage the substrate 302. The resilient member 310 may be manufactured from quartz, glassy carbon, nanotubes or other materials. The resilient member 310 provides variable axial positioning of the contact 304 of up to 10% in the axial direction such that the contact 304 maintains physical contact with the substrate 302 when the substrate 302 is moved or repositioned. Typically, the substrate 302 is held in position above the temperature sensor 300 during processing. Therefore, the contact 304 is urged downwardly by the substrate 302 and forced upwardly by the resilient member 310. The downward force of the substrate 302 is greater than the biasing force of the resilient member 310 such that the resilient member 310 is compressed when the contact 304 physically touches the substrate 302.

As previously described, the moveable fiber 308 is fixedly attached to the contact 304. Therefore, when the contact 304 is urged downwardly by the substrate 302, the fiber 308 also moves downwardly. As seen in FIG. 18, if the resilient member 310 is a spring, the fiber 308 is inserted within the interior of the spring such that the fiber 308 is free to move in the axial direction unimpeded. The resilient member 310 and the fiber 308 are surrounded by a shield 312 made from a material such as alumina that is resistive to high temperature and reactive gasses.

The end of the moveable fiber 308 that is opposite the end disposed within the cavity of the contact 304 is inserted into a guide 314. The guide 314 is fixedly attached to the shield 312 and an extension 316. The guide 314 and the extension 316 are formed from high temperature and reactive gas resistive materials such as alumina. The guide 314 contains a bore 318 through which the moveable fiber 308 is inserted into. Also disposed within the bore 318 is a fixed fiber 320 that is attached to the guide 314. The fixed fiber 320 may be a silica-silica optical fiber, sapphire or other material of high optical tranmissivity as is well known in the art. The moveable fiber 308 is axially moveable within the bore 318 such that a gap is formed between the ends of the moveable fiber 308 and the fixed fiber 320. The gap between the moveable fiber 308 and the fixed fiber 320 varies depending on the axial position of the contact 304. In this respect, as the contact 304 is moved downwardly, the gap between the moveable fiber 308 and the fixed fiber 320 decreases. Transmitted optical radiation can traverse the gap between the moveable fiber 308 and the fixed fiber 320. In this respect, optical radiation from the moveable fiber 308 can be transmitted through the fixed fiber 320.

The fixed fiber 320 extends from the guide 314 to a ferrule 328 in the extension 316 that is rigidly attached to a mount 326. The ferrule 328 provides a way to optomechanically couple the fixed fiber 320 to a device for measuring the signals transmitted therethrough. The ferrule 328 is attached to a base 322 made from a high temperature and reactive gas resistive material such as stainless steel. The base 328 forms a vacuum and reactive gas tight seal with the mount 326. A keeper 324 is used to urge the base 328 against the mount 326 in order to provide the vacuum and gas tight seal.

The materials of the temperature sensor 300 have thermal expansion properties to allow thermal expansion capability at relatively high temperatures. In this respect, the temperature sensor 300 can function at temperatures from −200 to 600 degrees centigrade.

Figure 19:
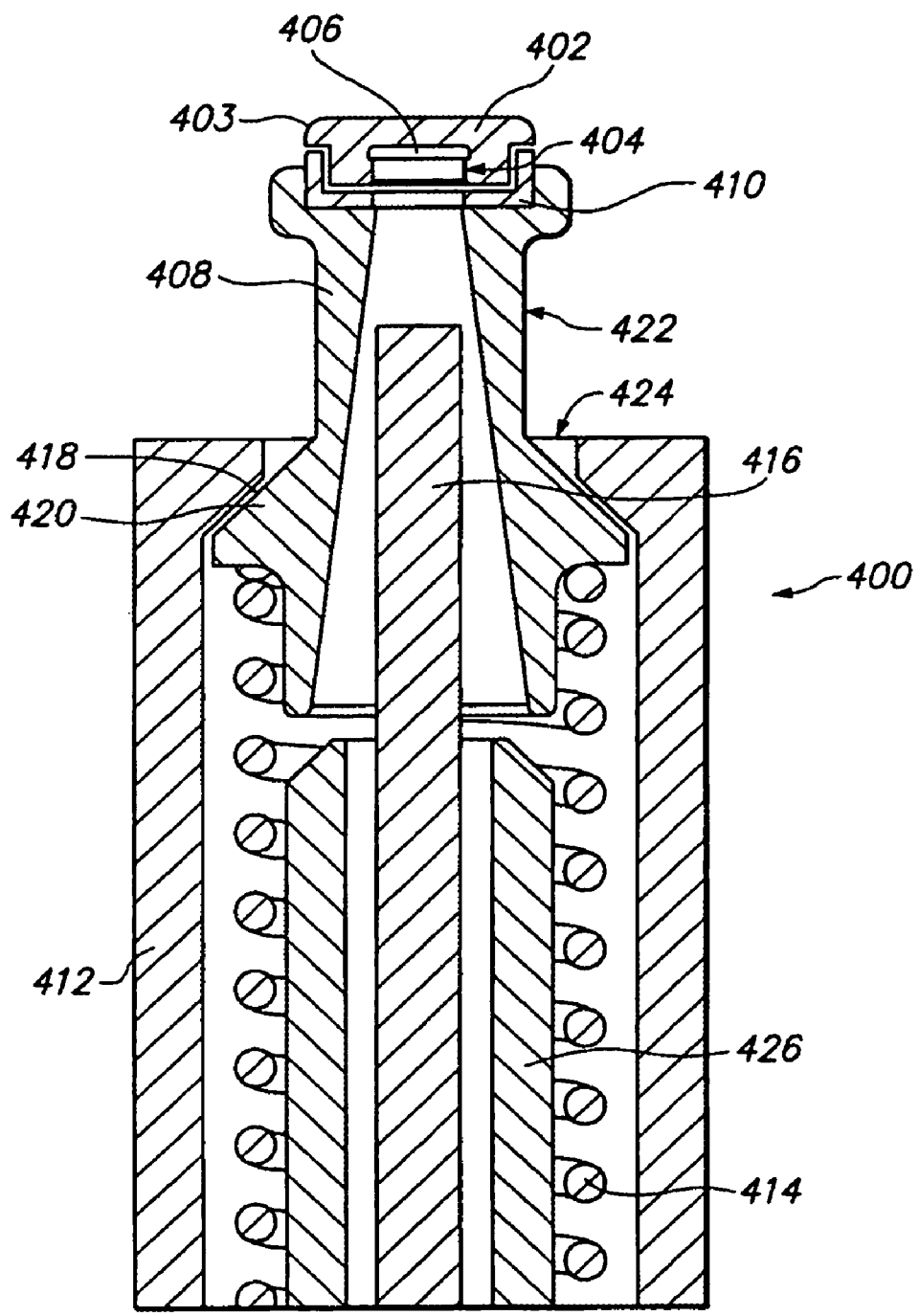
FIG. 19 is a cross-sectional view of yet another embodiment of a temperature sensor having a tip.

Referring to FIG. 19, another embodiment of a temperature sensor 400 is shown. The sensor 400 is similar to the sensor 300 and has a thermally conductive contact 402 which makes physical contact with a substrate (not shown). The contact 402 may have beveled or rounded corners 403 surrounding the surface thereof. By rounding the corners or edges of the surface of the contact 402, it is easier to achieve face-to-face engagement between the surface of the substrate and the surface of the contact 402. It will be recognized by those of ordinary skill in the art that the probes and contacts previously described can have beveled or rounded edges and corners. The rounded or beveled edges and corners 403 allow the contact 402 to slide into the best position for thermal contact with the substrate without hanging up on a relatively rough surface of the substrate.

The contact 402 has a cavity 404 upon which a layer 406 of phosphorescent material or black body material is deposited. The contact 402 is attached to a moveable tip 408 that is inserted within a shield 412. An adhesive layer 410 bonds the contact 402 to the tip 408.

Disposed within a cavity of the tip 408 is an optical fiber 416 that can transmit optical radiation from the layer 406. In this respect, the optical fiber 416 is positioned at a distance whereby optical radiation generated by the layer 406 can be transmitted through the fiber 416.

The tip 408 is moveable within the shield 412 and is biased toward the substrate by a resilient member 414 such as a spring. The resilient member 414 urges the tip 408 toward an annular ledge 418 formed within the end of the shield 412. A complementary mating surface 420 is formed in the tip 408. The resilient member 414 biases the mating surface 420 against the ledge 418. As can be seen in FIG. 19, the tip 420 comprises a barrel portion 422 that is disposed within an aperture 424 of the shield 412. The aperture 424 is formed slightly larger than the barrel portion 422 so that the tip 408 can rotate in order to maintain optimal contact with the substrate. The annular ledge 418 and complementary mating surface 420 ensures that the tip 418 is maintained within the shield 412. In order to ensure that the fiber 416 aligns with the phosphorescent material layer 406, the fiber 416 is inserted into a fixed fiber guide 426.

Although the various aspects of the present invention have been described with respect to exemplary embodiments, it will be understood that the invention is to be protected within the full scope of the attached claims. The temperature sensors previously described are ideally suited for different types of applications such as physical vapor deposition (PVD), dielectric etching, optical coating of glass substrates, chemical vapor deposition (CVD), metal organic chemical vapor deposition (MOCVD), low pressure chemical vapor deposition (LPCVD) and atomic layer deposition.

It is claimed:

1. A sensor for measuring the temperature of an object, the sensor comprising:
    a thermally conducting contact having a surface that emits electromagnetic radiation with a detectable optical characteristic that is functionally dependent on the temperature of the contact;
    a first light waveguide attached to the contact and configured to transmit the electromagnetic radiation from the contact;
    a guide having a bore through which the first waveguide is insertable into, such that when the contact is moved, the first waveguide Is movable within the bore;
    a resilient member directly attached to both the contact and the guide, wherein the resilient member extends the thermally conducting contact toward the object and provides the thermally conducting contact with rotational freedom with respect to the object; and
    a second light waveguide fixedly attached to the guide, the second light waveguide positioned to form a variable gap between an end of the first waveguide and an end of the second waveguide such that electromagnetic energy from the first waveguide traverses the gap and can be transmitted by the second waveguide.

2. The sensor of claim 1 further comprising a shield attached to the guide and surrounding the resilient member and the first waveguide.

3. The sensor of claim 1 further comprising an extension attached to the guide and surrounding the second waveguide.

4. The sensor of claim 3 further comprising a base attached to the extension for attaching the temperature sensor to a mount.

5. The sensor of claim 4 further comprising a keeper for securing the base to the mount.

6. The sensor of claim 4 further comprising a ferrule in optical communication with the second waveguide and attached to the base, the ferrule being configured to transmit the optical radiation emitted from the second waveguide.

7. The sensor of claim 1 being configured to measure the temperature of a process selected from the group consisting of:
    physical vapor deposition;
    dielectric etching;
    optical coating of glass substrates;
    chemical vapor deposition;
    metal organic vapor deposition;
    low pressure chemical vapor deposition; and
    atomic layer deposition.

8. The sensor of claim 1 wherein the electromagnetic radiation emitting surface includes a surface of a layer of luminescent material attached to an inside of the cap.

9. The sensor of claim 1 wherein the electromagnetic radiation emitting surface includes a surface of known emissivity that emits radiation within an infrared range.

10. The sensor of claim 1 wherein the contact has an end wall with a rounded edge to facilitate contact with the surface of the object.

11. A sensor for measuring the temperature of an object, the sensor comprising:
    a thermally conducting contact having a surface that emits electromagnetic radiation with a detectable optical characteristic that is functionally dependent on the temperature of the contact;
    a tip attached to the contact, the tip having a barrel section and a mating section;
    a shield having an opening with an annular ledge formed in an end thereof, the opening being configured such that the barrel section passes therethrough and the annular ledge being shaped complementary to the mating section of the tip;
    a resilient member attached to the tip and configured to extend the barrel section through the opening and extend the contact toward the object; and
    a light waveguide disposed within the tip and configured to transmit the electromagnetic radiation emitted from the surface of the contact wherein the light waveguide is spaced at a distance from the thermally conducting surface;
    wherein the opening and the annular ledge allow a limited degree of directional freedom of the tip to thereby provide engagement between the contact and the object.

12. The sensor of claim 11 further comprising a fiber guide configured to secure the waveguide within the shield.

13. The sensor of claim 11 being configured to measure the temperature of a process selected from the group consisting of:
    physical vapor deposition;
    dielectric etching;
    optical coating of glass substrates;
    chemical vapor deposition;
    metal organic vapor deposition;
    low pressure chemical vapor deposition; and
    atomic layer deposition.

14. The sensor of claim 11 wherein the electromagnetic radiation emitting surface includes a surface of a layer of luminescent material attached to an inside of the cap.

15. The sensor of claim 11 wherein the electromagnetic radiation emitting surface includes a surface of known emissivity that emits radiation within an infrared range.

16. The sensor of claim 11 wherein the contact has an end wall with a rounded edge to facilitate contact with the surface of the object.

* * * * *